(12) United States Patent
Caveney et al.

(10) Patent No.: US 6,584,652 B2
(45) Date of Patent: Jul. 1, 2003

(54) LOW THREAD FORCE CABLE TIE WITH ANCHORED LOCKING DEVICE

(75) Inventors: Jack E. Caveney, Hinsdale, IL (US);
Robert J. Krisel, Oak Forest, IL (US);
James A. Brownlee, Park Forest, IL (US); Joseph P. Leszczewicz, Grant Park, IL (US)

(73) Assignee: Panduit Corp., Tinley Park, IL (US)

( * ) Notice: Subject to any disclaimer, the term of this patent is extended or adjusted under 35 U.S.C. 154(b) by 0 days.

(21) Appl. No.: 10/342,830

(22) Filed: Jan. 15, 2003

(65) Prior Publication Data
US 2003/0101543 A1 Jun. 5, 2003

Related U.S. Application Data

(62) Division of application No. 09/855,262, filed on May 15, 2001, now Pat. No. 6,530,126.

(51) Int. Cl.[7] .................. B65D 63/14; B26F 1/00
(52) U.S. Cl. ........... 24/16 PB; 24/17 AP; 24/30.5 P; 72/362; 72/369; 72/379.2
(58) Field of Search .................. 24/16 PB, 17 AP, 24/30.5 P; 411/437; 248/74.3; 72/362, 363, 369, 370.04, 379.2

(56) References Cited

U.S. PATENT DOCUMENTS

| 3,186,047 A | * | 6/1965 | Schwester et al. | 24/16 PB |
| 3,457,598 A | * | 7/1969 | Mariani | 24/16 PB |
| 3,488,813 A | * | 1/1970 | Kohke | 24/16 PB |
| 3,588,961 A | * | 6/1971 | Farago | 24/16 PB |
| 3,875,618 A | * | 4/1975 | Schuplin | 24/17 AP |
| 5,121,524 A | * | 6/1992 | Mortensen | 24/16 PB |
| 5,193,251 A | * | 3/1993 | Fortsch | 24/16 PB |
| 5,513,421 A | * | 5/1996 | Wells | 24/16 PB |
| 5,517,727 A | * | 5/1996 | Bernard et al. | 24/16 PB |
| 5,621,949 A | * | 4/1997 | Wells et al. | 24/16 PB |
| 5,630,252 A | * | 5/1997 | Wells | 24/16 PB |

* cited by examiner

Primary Examiner—Victor Sakran
(74) Attorney, Agent, or Firm—Robert A. McCann; Jay A. Saltzman; Christopher S. Clancy

(57) ABSTRACT

A two piece cable tie is provided having an improved metal locking device anchoring system. The cable tie includes a strap including a first end and a free end and a locking head secured to the first end of the strap that defines a strap accepting channel in the head having a strap entry end and a strap exit end. The locking head further includes a metal locking device receiving cavity adjacent to and open toward the strap exit end of the locking head and a mounting slot having an inner support wall, an outer support wall and a support slot communicating the mounting slot with the receiving cavity. A metal locking device is mounted through the metal locking device receiving cavity into the mounting slot. The metal locking device has a free end positioned within the strap accepting channel and a fixed end having at least one bent tang protruding outwardly from a surface of the metal locking device. The fixed end having the at least one bent tang is insertable through the support slot. Upon such insertion, the inner support surface of the mounting slot resiliently urges at least a protruding edge of the at least one bent tang against the outer support surface to anchor the metal locking device within the mounting slot and resist withdrawal of the metal locking device in a direction towards the exit end of the strap accepting channel. The inventive cable tie is capable of multiple strap threading without failure. The barbed anchoring system and method are particularly suited for cable ties having a bent metal locking device with a mounting slot parallel with the strap accepting channel.

8 Claims, 17 Drawing Sheets

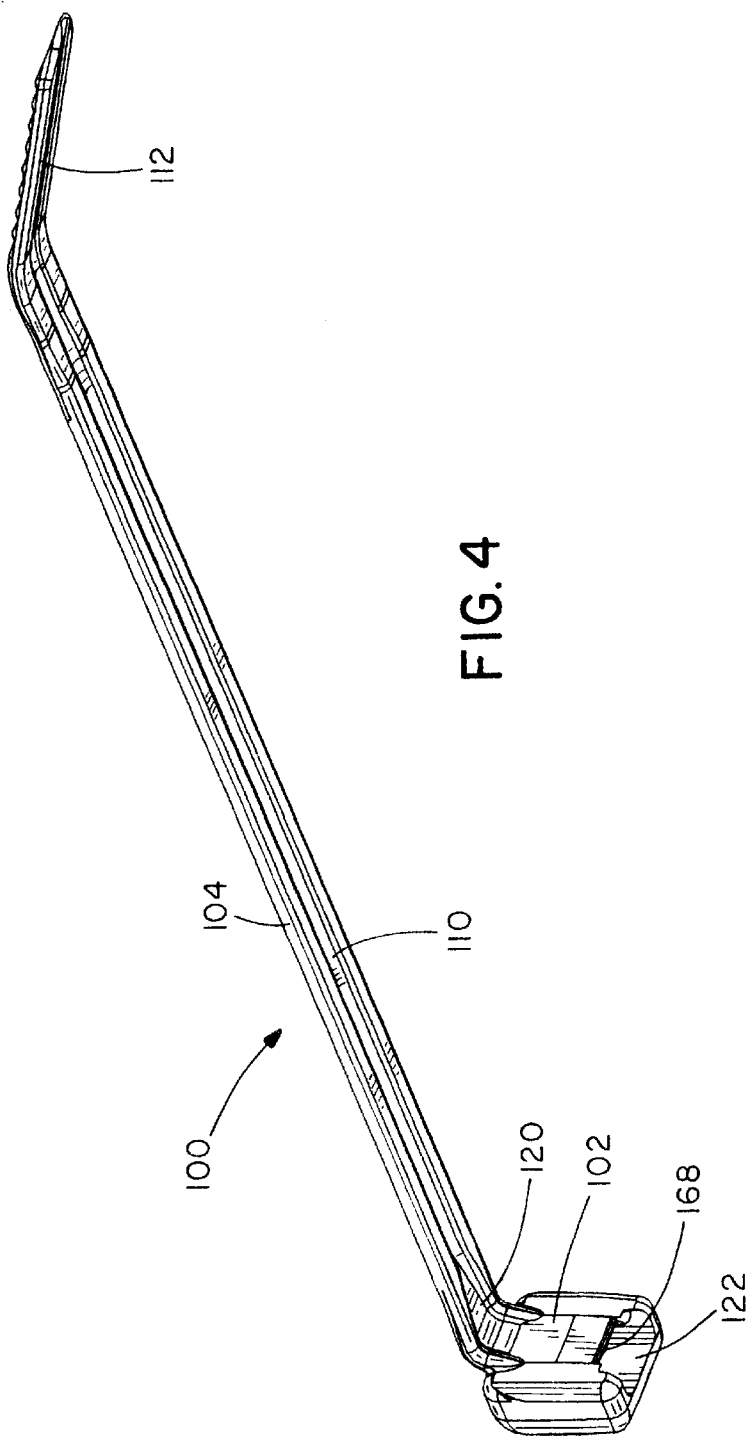
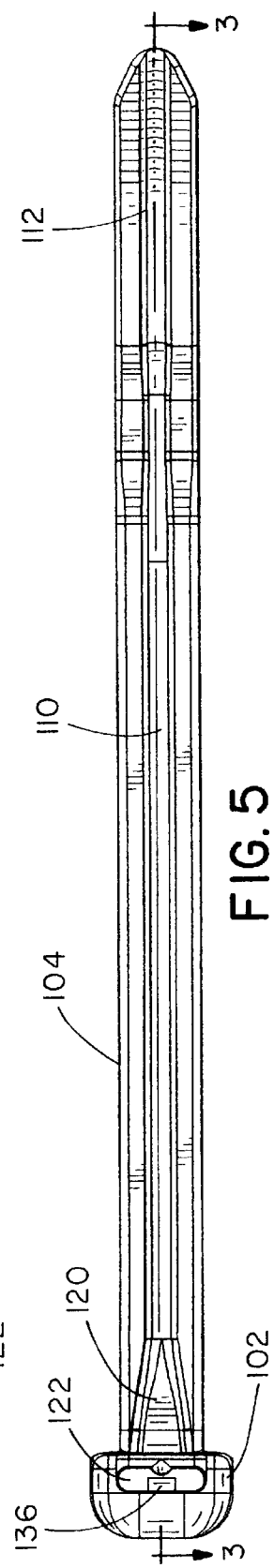
FIG. 4
FIG. 5

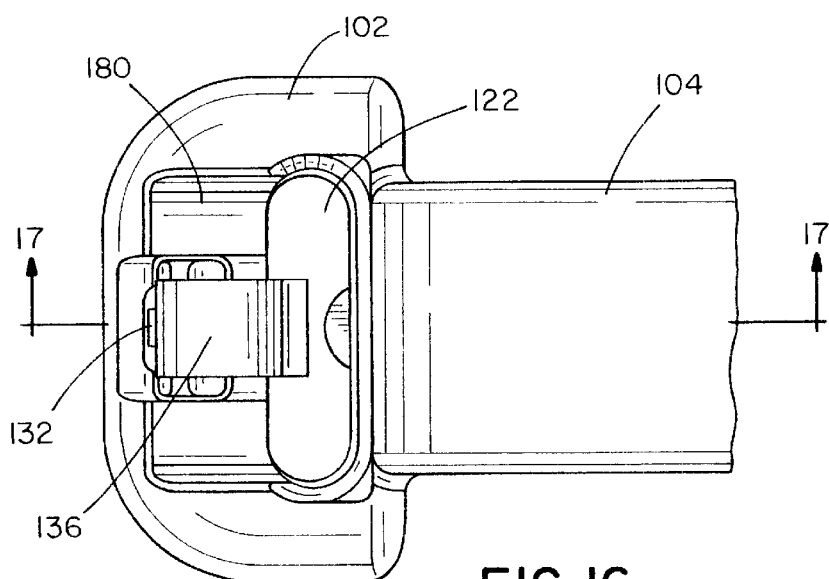
FIG. 16
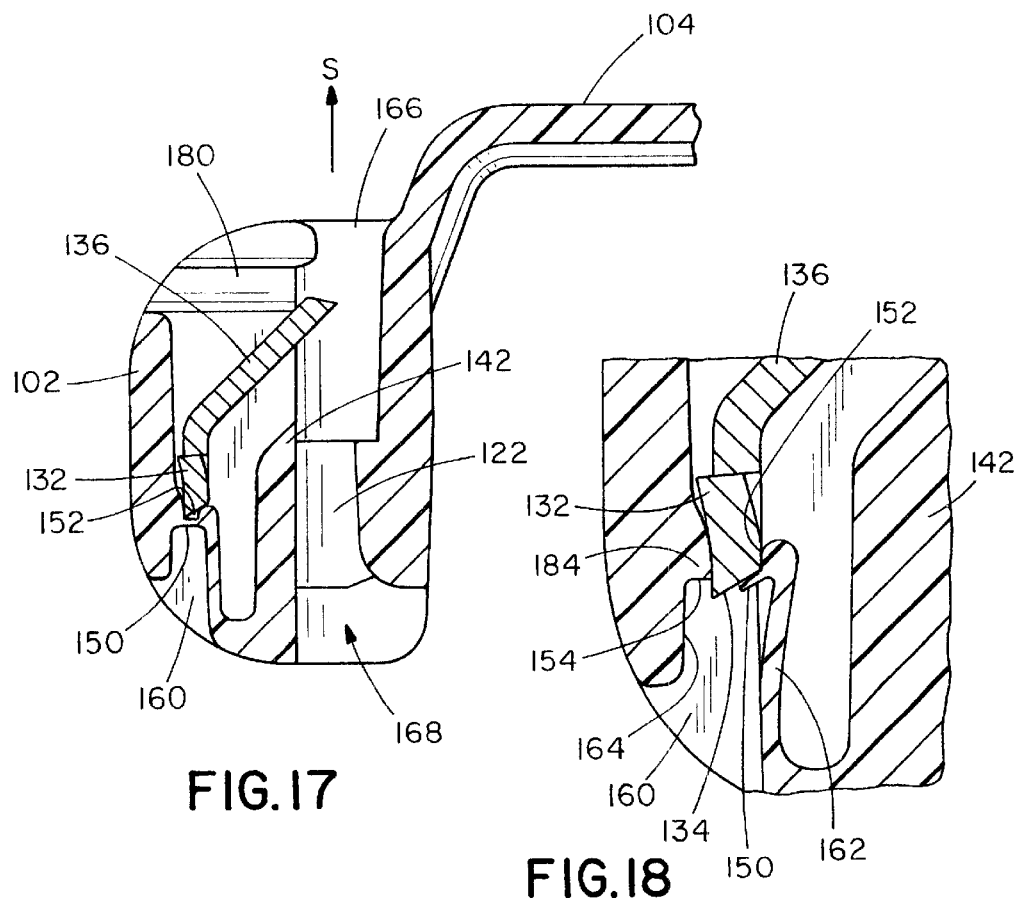
FIG. 17
FIG. 18

LOW THREAD FORCE CABLE TIE WITH ANCHORED LOCKING DEVICE

CROSS-REFERENCE TO RELATED APPLICATIONS

This application is a divisional of application Ser. No. 09/855,262, filed May 15, 2001, now U.S. Pat. No. 6,530,126.

BACKGROUND OF THE INVENTION

1. Field of Invention

The present invention relates generally to a low thread force two piece cable tie. More particularly, the invention relates to a locking device for such a cable tie that has an integral protruding tang serving as an anchoring device.

2. Description of Related Art

Plastic cable ties having metal locking device inserts are well known in the art. Examples of such include U.S. Pat. No. 3,457,598 to Mariani and U.S. Pat. No. 5,517,727 to Bernard et al.

Cable ties of this type include a metal locking device partially embedded at an angle within a strap accepting channel of a cable tie head. The metal locking device is situated at an angle that allows insertion of a cable tie strap in an insertion direction, but allows for engagement of the locking device with the strap when it is pulled in a removing direction to prevent removal. The metal locking device of such cable ties is in the form of a cantilevered beam that is fixed at one end and extends into the strap accepting channel at the free end. Operation of such a cable tie will be described with respect to FIGS. 1–3, which show operation of a cable tie device according to copending U.S. patent application Ser. No. 09/855,383, the subject matter of which is incorporated herein by reference in its entirety.

The cable tie 100 of FIG. 1 includes a strap 104 (partially shown) integral with a cable tie head 102. Cable tie head 102 is formed with a locking device receiving cavity 180 and a strap accepting channel 122 having a strap entrance 168 and a strap exit 166. Strap accepting channel 122 receives the leading end 112 of strap 104. Locking device receiving cavity 180 receives a pre-formed metal locking device 136, which is formed from a corrosion resistant metal such as stainless steel.

Locking device receiving cavity 180 is provided to allow access to the anchoring region on the end wall for partial embedding of metal locking device 136 in a mounting slot 130 of the cable tie head 102. Mounting slot 130 may be preformed in an interior surface of cavity 180 or may be partially formed as a result of pressing an end 134 of locking device 136 into the interior surface of cable head 102. This defines a cantilever beam structure having a fixed end 134 and a free end 138 that extends into strap accepting cavity 122. Metal locking device receiving cavity 180 also allows for movement of locking device 136.

As shown in FIG. 1, upon insertion of strap end 112 into the strap accepting channel, the free end of metal locking device 136 freely flexes due to the resiliency of the metal and the angle of the device to provide a low insertion force. Insertion of the cable tie strap continues to occur until strap 104 is sufficiently tight around an object to be constrained, such as an unshown cable bundle. Upon release of the strap, or through application of a withdrawal force on the strap, forces flex free end 138 of metal locking device 136 and cause a sharpened portion of free end 138 to begin to pierce strap 104 as shown in FIG. 2. When free end 138 sufficiently rests upon the fulcrum point 142, resistance to further withdrawal is attained up to a determinable tensile strength value, which is dependent on material selection and other variables.

Such a cable tie is sufficient for a single locking application (i.e., a single tightening operation). However, what occasionally happens is that after an initial tightening or attempt to withdraw the cable tie strap 104, a subsequent tightening or re-threading action may be initiated to further cinch down the cable tie. As the free end 138 of metal locking device 136 has already partially penetrated the surface of strap 104, it is possible that during these further re-thread attempts to advance the strap in the direction of exit 166, the free end will not break free from strap 104. Instead, the locking device 136 will remain partially embedded within the surface of strap 104. In such cases, if the retention force of the fixed end 134 is less than the withdrawal force necessary to break away free end 138 from strap 104, it is possible that fixed end 134 will be pulled out of slot 130. This is undesirable and results in cable tie failure as shown in FIG. 3, in which metal locking device 136 is either completely removed or sufficiently withdrawn from slot 130 to adversely affect proper cable tie functioning. In this example, the retention force acting on fixed end 134 to resist removal is the frictional force between fixed end 134 and slot 130. This retention force may be insufficient and is particularly problematic where the fixed end is oriented substantially parallel to the re-threading force acting on strap 104 toward exit 166, as in this example.

There is a need for a two-piece cable tie having an improved anchor retention system for a metal locking device.

There also is a need for a method of easily forming a barbed tang on a metal locking device of a cable tie to serve as an anchor.

SUMMARY OF THE INVENTION

It is an object of the invention to provide a two-piece cable tie with a locking device that has improved anchoring force to resist removal during initial and subsequent re-threading.

It also is an object of the invention to provide a method of forming a barbed tang on a metal locking device of a cable tie.

It is further an object of the invention to punch one or more tangs onto a metal locking device so as to form a ramp that is in a direction conducive to installation but provides resistance to attempts to withdraw the device.

The above and other objects are achieved by a cable tie having an anchored metal locking device, comprising: a strap including a first end and a free end; a locking head secured to the first end of the strap, the locking head defining a strap accepting channel in the head having a strap entry end and a strap exit end, the locking head further including a metal locking device receiving cavity adjacent to and open toward the strap exit end of the locking head, the locking head further including a mounting slot having an inner support wall, an outer support wall and a support slot communicating the mounting slot with the receiving cavity; and a metal locking device mounted through the metal locking device receiving cavity into the support cavity, the metal locking device having a free end positioned within the strap accepting channel and a fixed end having at least one bent tang protruding outwardly from a surface of the metal locking device. The fixed end having the at least one bent tang is insertable through the support slot. Upon such insertion, the inner support surface of the mounting slot resiliently urges at least a protruding edge of the at least one bent tang against the outer support surface to anchor the metal locking device within the mounting slot and resist withdrawal of the metal locking device in a direction towards the exit end of the strap accepting channel.

The invention also provides a method of forming a cable tie having an improved anchoring system comprising the steps of: forming a cable tie having a strap including a first end and a free end and a locking head secured to the first end of the strap, the locking head defining a strap accepting channel in the head having a strap entry end and a strap exit end, the locking head further including a metal locking device receiving cavity adjacent to and open toward the strap exit end of the locking head, the locking head further including a mounting slot having an inner support wall, an outer support wall and a support slot communicating the mounting slot with the receiving cavity; forming a metal locking device with a fixed end having at least one bent tang and a free end; initially mounting the metal locking device through the metal locking device receiving cavity into the mounting slot by inserting the fixed end through the support slot until the fixed end is urged against the inner support wall; and further inserting the metal locking device into the mounting slot and causing the inner support surface to be resiliently deformed until the at least one bent tang is substantially received within the mounting slot, at which time the inner support surface urges at least an edge of the at least one bent tang against the outer support surface to securely anchor the metal locking device to the mounting slot.

BRIEF DESCRIPTION OF THE DRAWINGS

The foregoing and further objects, features and advantages of the present invention will become apparent from the following description of preferred embodiments with reference to the accompanying drawings, wherein:

FIG. 4 is a lower perspective view of a cable tie according to the invention;

FIG. 5 is a bottom view of the cable tie of FIG. 4;

FIG. 16 is a top partial view of a cable tie according to a second embodiment of the invention;

FIG. 17 is a cross-sectional view of the cable tie of FIG. 16 taken along line 17—17 showing a partially installed metal locking device;

FIG. 18 is a blow-up partial view of FIG. 17;

DETAILED DESCRIPTION OF PREFERRED EMBODIMENTS

Figure 1:
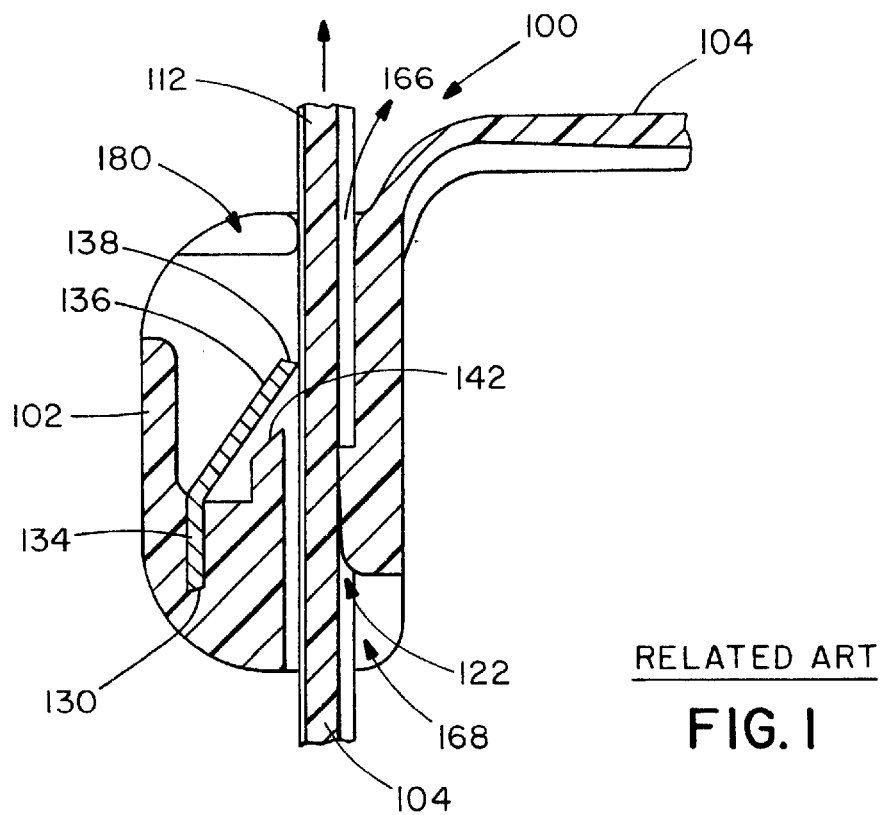
FIG. 1 is a cross-sectional view of an initial threading of a cable tie strap according to a related invention.

An inventive cable tie 100 with a securely anchored metal locking device according to a first embodiment will be described with reference to FIGS. 4–15. As best shown in FIGS. 4–5, cable tie 100 includes a locking head 102 and a strap 104. Cable tie 100 can be made from various materials as known in the art. Suitable materials include by way of example, nylon, polypropylene, and various fluoropolymers. Cable tie 100 can be formed in various sizes and lengths to suit a particular application as also known in the art. Obviously, desired loop tensile strength is one factor to decide when selecting sizing of the strap, locking head, locking device and other components.

While cable tie 100 is shown to have locking head 102 with a strap accepting channel 122 parallel to a strap attachment axis S and a strap that is bent at approximately 90° from strap attachment axis S, cable tie 100 is not limited to such a configuration and may take other forms. For example, the cable tie 100 may have a straight strap that continues to extend substantially along axis S. Additionally, cable tie 100 may have a more conventional right angle locking head such as that shown in Bernard '727, that has a strap accepting channel at a right angle to strap attachment axis S.

Strap accepting channel 122 of cable tie head 102 receives a leading end 112 of strap 104 during use. Strap accepting channel 122 includes a strap entry end 168 through which strap 104 is first inserted and a strap exit end 166. Leading end 112 is preferably tapered. Strap 104 may be provided with a longitudinally extending central groove 110 on the inside surface and a longitudinally extending central slot on the outside surface (unshown). Central groove 110 may taper at the end of the strap adjacent locking head 102 to form an increased width, such as by providing a V-groove 120 as best shown in FIGS. 4–5.

Figure 6:
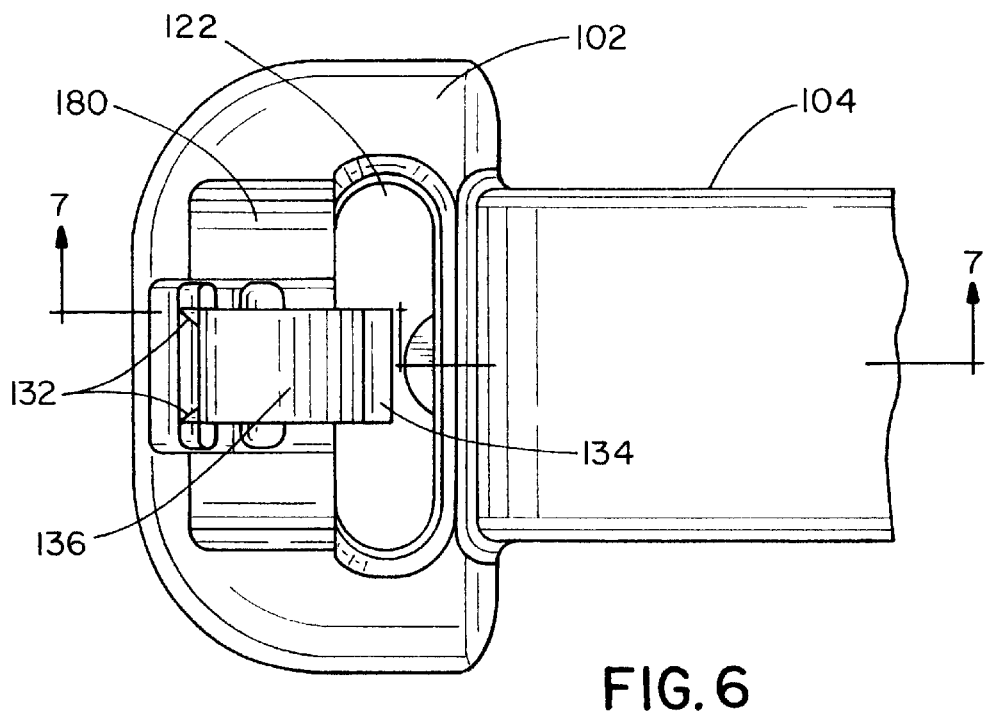
FIG. 6 is top partial view of a cable tie according to the invention.
Figure 7:
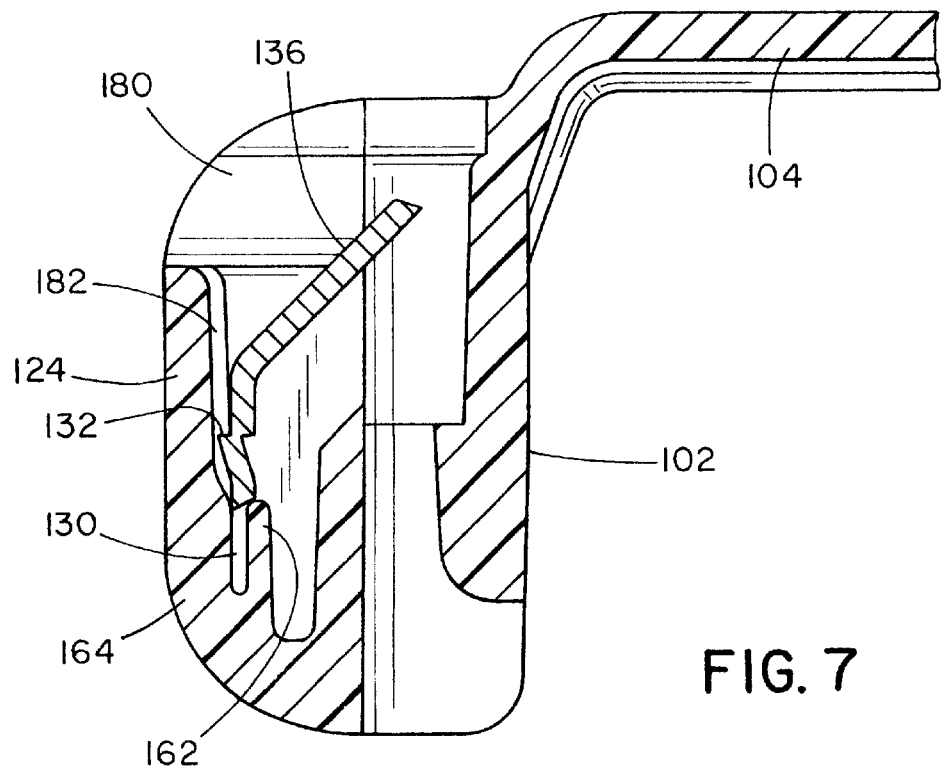
FIG. 7 is a cross-sectional view of the cable tie of FIG. 6 taken along line 7—7 according to a first embodiment showing a partially installed metal locking device.
Figure 8:
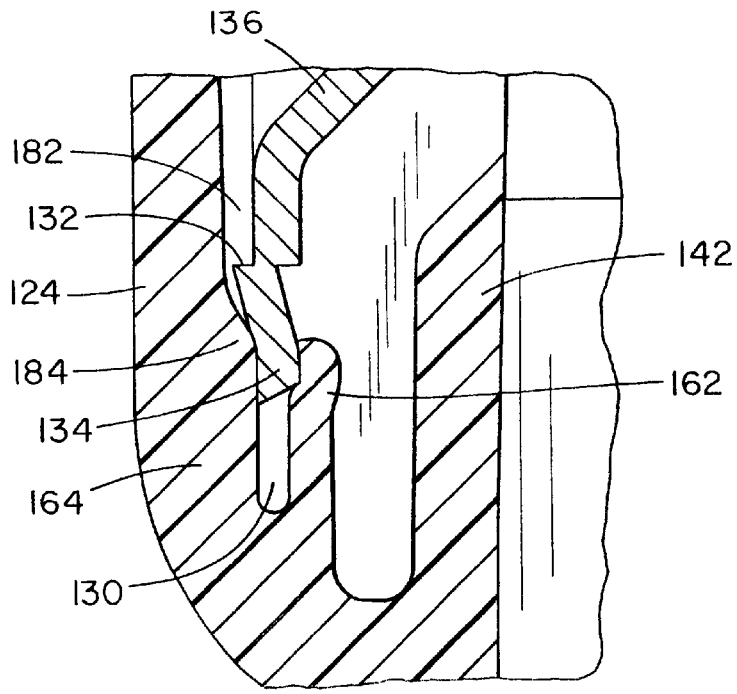
FIG. 8 is a blow-up partial view of FIG. 7.

As better shown in FIGS. 6–8, locking head 102 also includes a locking device receiving cavity 180. Locking device receiving cavity 180 provides access to the anchoring region for metal locking device 136 for partial embedding of metal locking device 136 in a mounting slot 130 of locking head 102 to define a cantilever beam structure having a fixed end 134 and a free end 138 that extends into strap accepting cavity 122. Metal locking device receiving cavity 180 also allows for movement of locking device 136 and includes a relief portion 182 (recessed wall) and protruding wall portion 184. Relief 182 is formed in end wall 124 at a lower part of receiving cavity 180 adjacent to the mounting slot 130. Mounting slot 130 also includes an outer support surface 164 and an inner support surface 162.

Metal locking device 136 is preferably formed from a corrosion resistant metal, such as stainless steel as known in the art. While metal locking device 136 may take a conventional straight form, it is preferably bent or formed so that free end 138 is at a predetermined angle relative to fixed end 134. It is also preferable for fixed end 134 to be substantially parallel to the axis of strap accepting channel 122. This allows for easier insertion of locking device 136 into cavity 180. It also allows for a lower profile cable tie head. In any case, free end 138 extends into strap accepting channel 122 at an acute angle relative to the axis of strap accepting channel 122 facing strap exit end 166. Moreover, according to the invention, metal locking device 136 is provided with one or more bent protruding tangs 132 that project outward from the surface of fixed end 134 and act to anchor the locking device within support cavity 130 of locking head 102.

Figure 14:
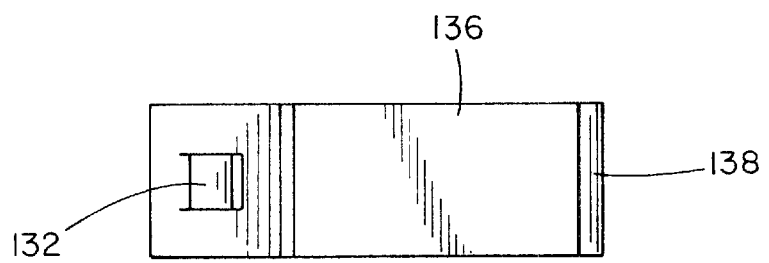
FIG. 14 is a top view of a second embodiment of the metal locking device according to the invention.
Figure 15:
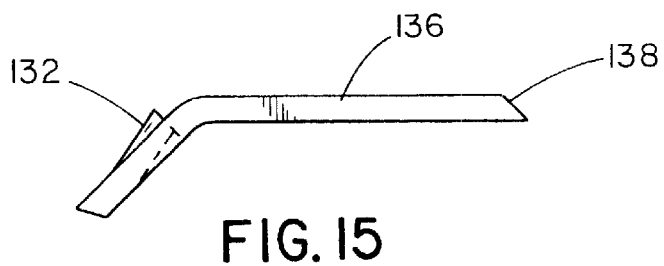
FIG. 15 is a side view of a metal locking device of FIG. 14.

A first preferred embodiment of the metal locking device 136 is shown in FIGS. 10–13 and has two bent tangs 132, which are preferably formed on edge surfaces of fixed end 134 and are angled outward. Another embodiment of the metal locking device is shown in FIGS. 14–15 and includes a single bent tang 132 projecting from an intermediate surface of the locking device 136.

Figure 2:
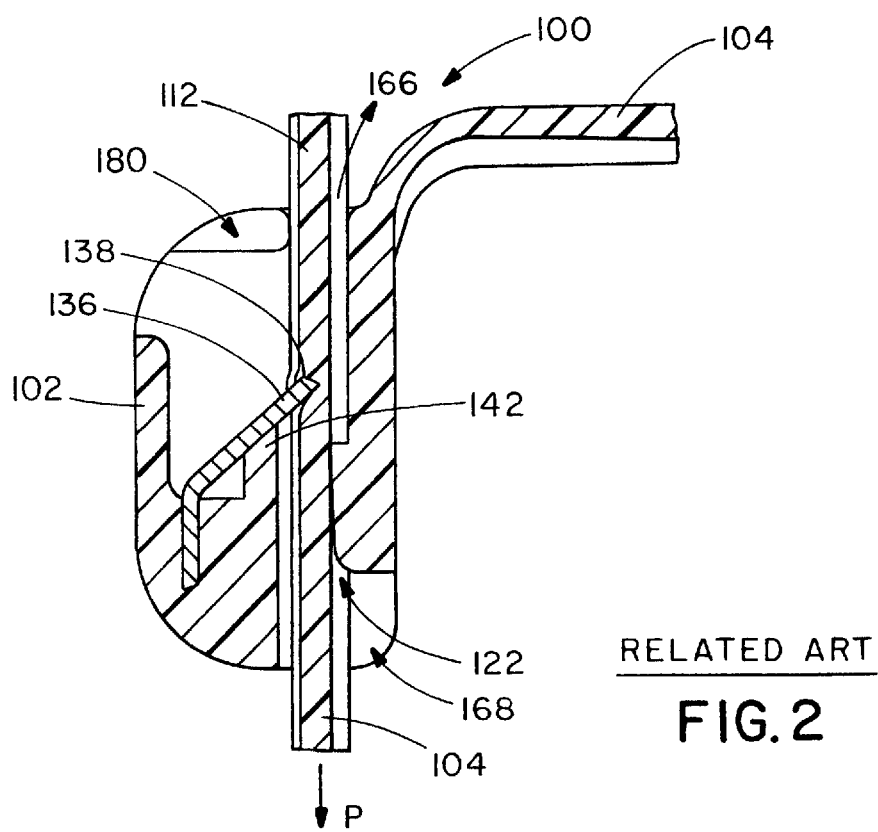
FIG. 2 is a cross-sectional view of the cable tie of FIG. 1 showing the cable tie strap after a locking operation has been performed.
Figure 3:
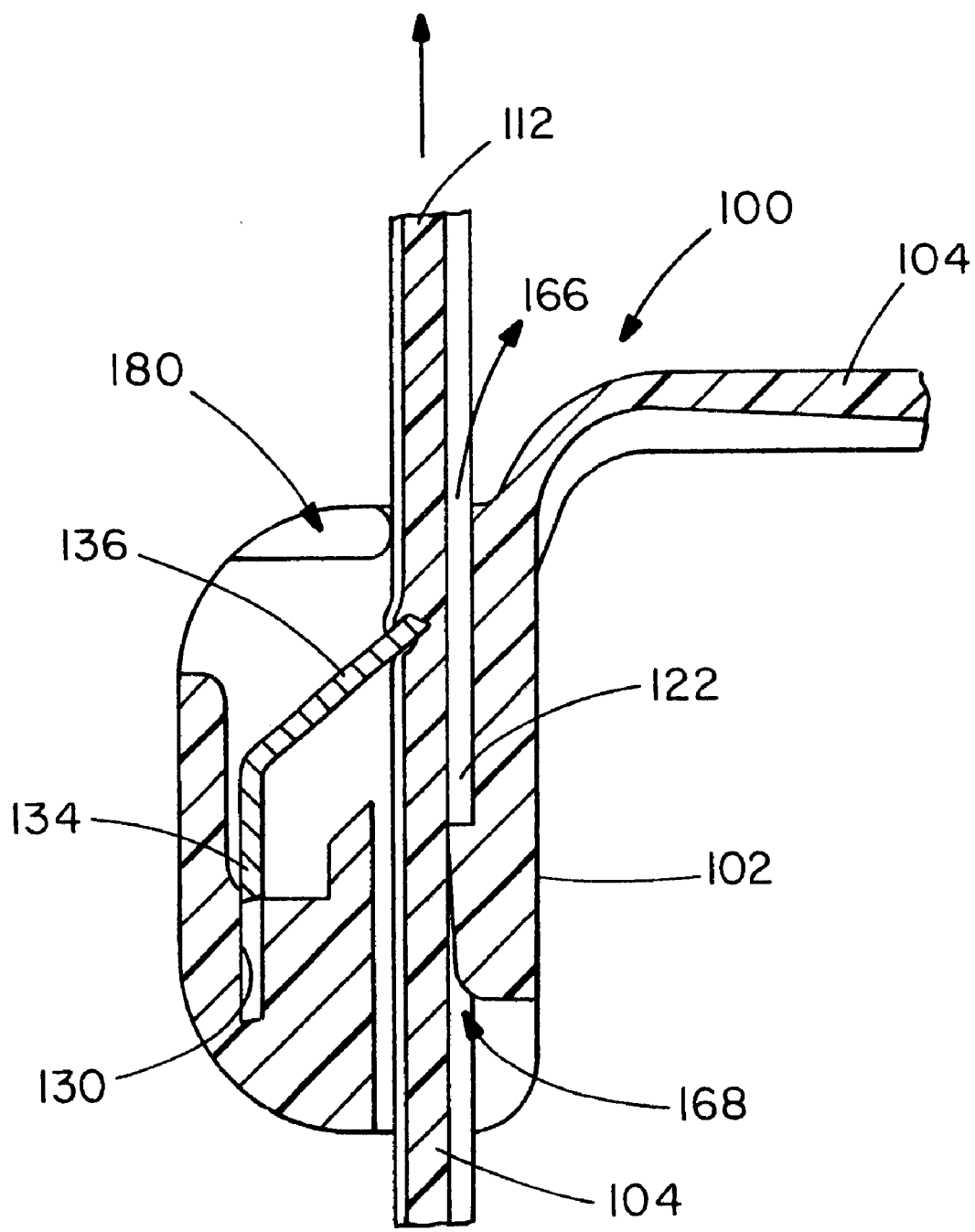
FIG. 3 is a cross-sectional view of the cable tie of FIG. 1 showing the cable tie strap after a re-threading operation.
Figure 9:
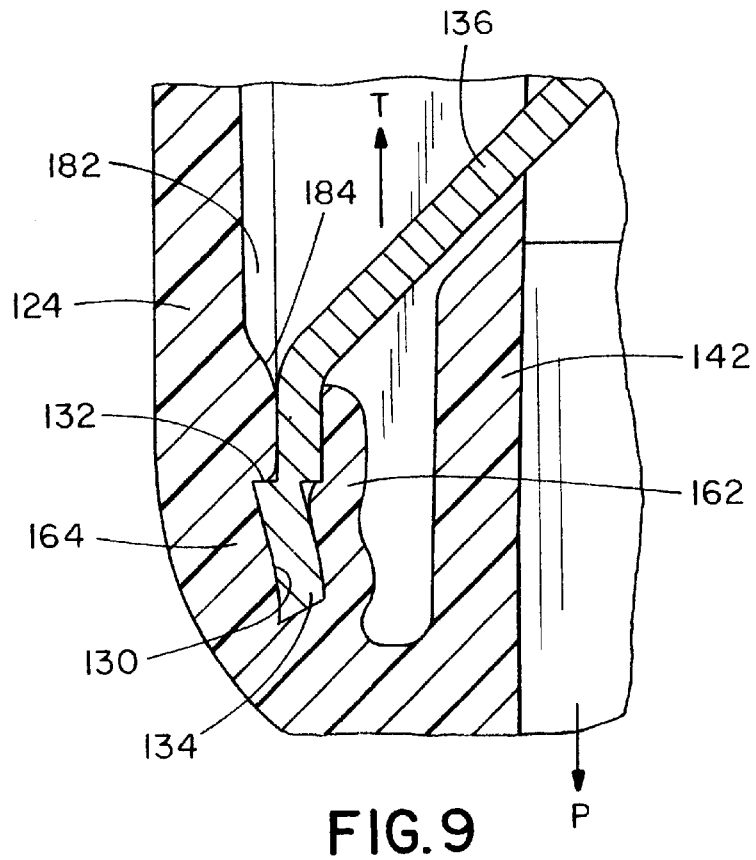
FIG. 9 is a cross-sectional view of a fully installed metal locking device according to the first embodiment.
Figure 10:
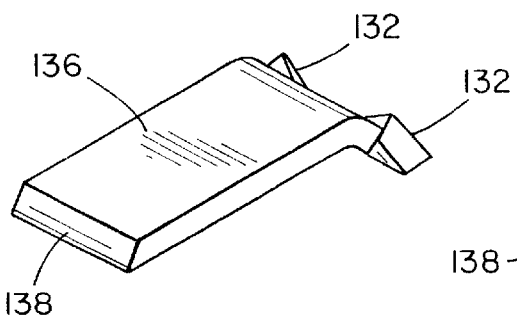
FIG. 10 is a perspective view of a metal locking device according to a first embodiment of the invention.
Figure 11:
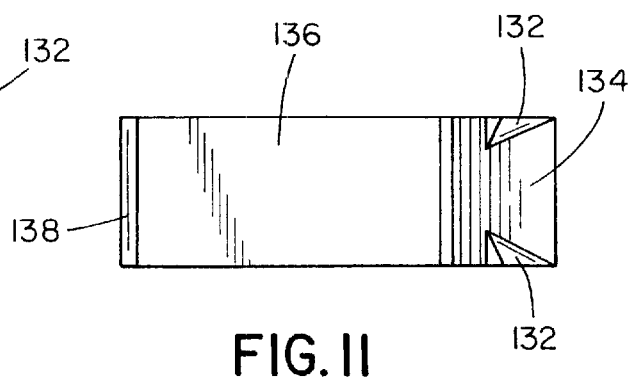
FIG. 11 is a top view of the metal locking device of FIG. 10.
Figure 12:
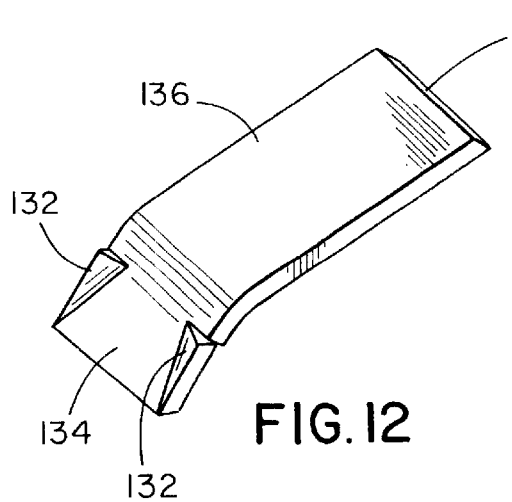
FIG. 12 is another perspective view of the metal locking device of FIG. 10.
Figure 13:
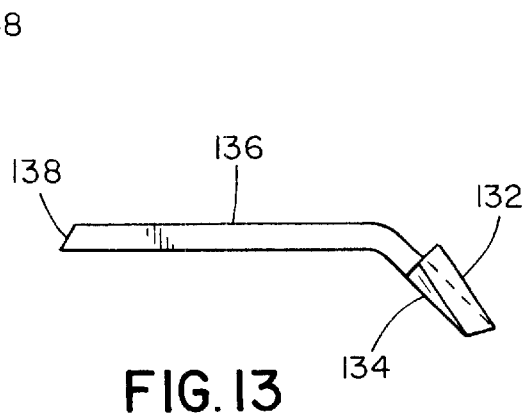
FIG. 13 is a side view of the metal locking device of FIG. 10.

Referring back to FIGS. 7–8, metal locking device 136 is shown being installed through receiving cavity 180 and partially inserted into mounting slot 130. FIG. 9 shows the metal locking device 136 fully inserted. As best shown in FIG. 8, when the metal locking device 136 is installed, relief 182 allows the locking device to be inserted without interference with the locking device receiving cavity walls until the metal locking device 136 has been sufficiently inserted into the mounting slot 130. This keeps the metal locking device straight during installation. At such time of partial insertion, fixed end 134 penetrates through an entrance of the mounting slot 130 while the at least one bent protruding tang 132 is still located in receiving cavity 180. That is, bent tang 132 is accommodated by the relief 182 so as to align the metal locking device while not inhibiting insertion. Upon further insertion, the at least one bent tang 132 is forced through the entrance to mounting slot 130 as shown and the inner support surface 162 becomes displaced (i.e., pushed to the right as shown in FIG. 8). After sufficient insertion, bent tang 132 becomes substantially within, and preferably entirely within, mounting slot 130, as shown in FIG. 9. Due to this configuration, two elements assist in retaining the metal locking device securely within the mounting slot 130. First, the urged inner support surface 162 acts to bias the locking device 136 toward the outer support surface 164. That is, the inner support surface 162 elastically relaxes in an attempt to return to its original position. Further, while the shape of the bent tang 132 allows for a rather low resistance to insertion, due to the outwardly projecting jagged edges, tangs 132 tend to bite into the outer support surface 164 due to the biasing from the inner support surface 162. Forces acting to remove the free end of the strap in direction P, as shown in FIGS. 2 and 9, act to further urge the sharp jagged edge of bent tang 132 against the outer support surface 164 effectively increasing the anchoring force provided by this structure. Forces acting to remove the metal locking device from slot 130 in direction T, as shown in FIG. 9, are resisted by the biting engagement of tang 132 against outer support surface 164.

Referring back to FIGS. 7–9, once fully inserted, cantilevered metal locking device 136 is supported at a fulcrum point defined by an upper edge 142 of an inner wall of cable head 102. Metal locking device 136 has a free length defined from the fulcrum point to free end 138 that allows free end 138 to extend into channel 122 by a distance to sufficiently engage a strap being threaded through strap accepting channel 122 and prevent withdrawal of the strap from the channel.

A second embodiment of the invention will be shown with reference to FIGS. 16–23. As better shown in FIGS. 16–18, cable tie head 102 includes a locking device receiving cavity 180 as in the first embodiment. Locking device receiving cavity 180 receives metal locking device 136 and is provided to allow access for partial embedding of metal locking device 136 in a mounting slot 160 of cable tie head 102. As in the first embodiment, metal locking device receiving cavity 180 also allows for movement of locking device 136 and includes a relief portion 182 (recessed wall) and protruding wall portion 184.

As with the locking device of the first embodiment, metal locking device 136, of this second embodiment can be provided with one or more bent protruding tangs 132 that project outward from the surface of fixed end 134. These bent tangs may be the same as the exemplary bent tangs shown in FIGS. 10–15. Thus, while it is to be noted that this second embodiment is being shown and described with the metal locking device 136 as shown in FIGS. 14 and 15, neither the first or the second embodiments are limited to the locking devices shown.

Figure 23:
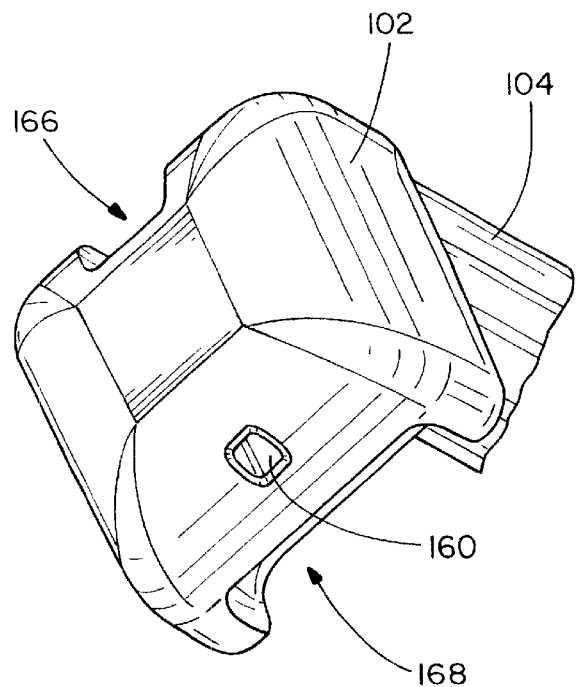
FIG. 23 is a partial perspective view of the cable tie of FIG. 22.

As can be seen in FIG. 17, an entrance slot 152 is formed in a wall portion 150 disposed at an interior wall of mounting slot 160. Entrance slot 152 is preferably less thick than locking device 136. As in the first embodiment, mounting slot 160 also includes an outer support surface 164 and an inner support surface 162. However, in the second embodiment, the slot 160 is preformed and is designed with inner and outer support walls that are farther apart than the width of entrance slot 152 so as to define a receiving ledge 154 on a lower side of wall portion 150 between entrance 152 and outer surface 164. As best shown in FIG. 23, mounting slot 160 may include an opening that extends to the exterior of cable tie head 102.

Figure 19:
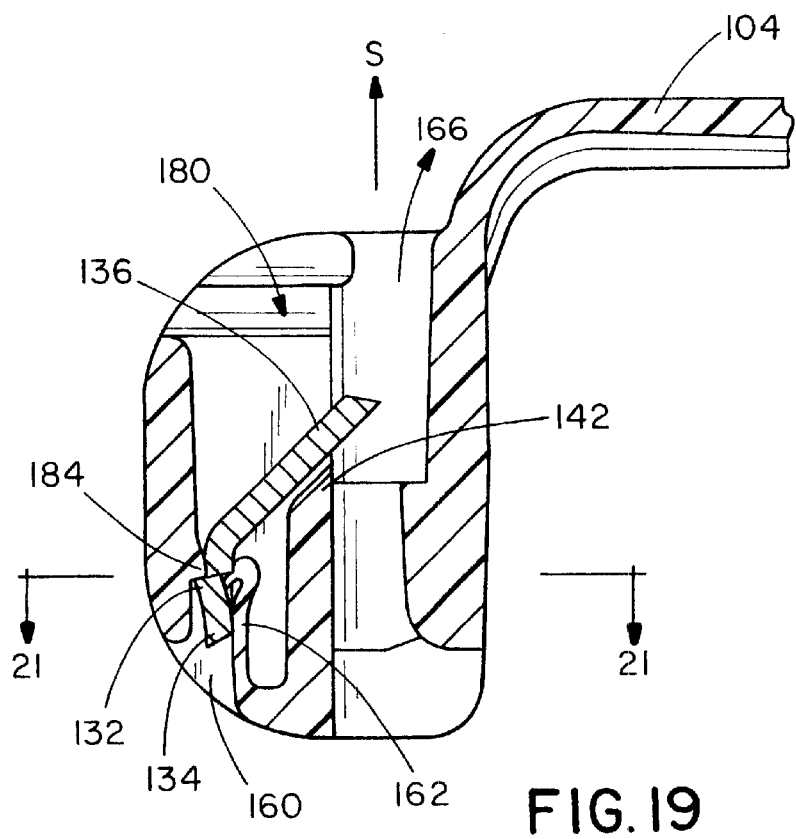
FIG. 19 is a cross-sectional view of the cable tie of FIG. 17 with a fully installed metal locking device.
Figure 20:
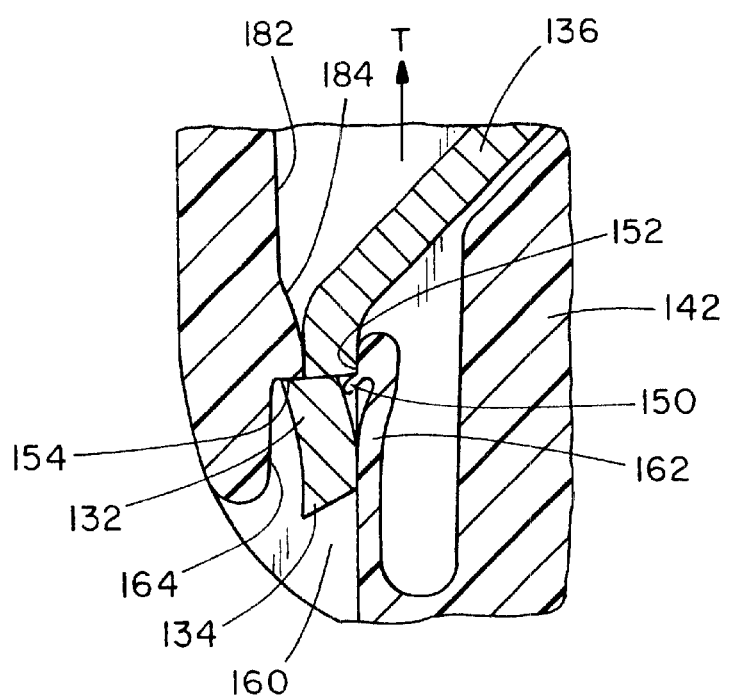
FIG. 20 is a blow-up partial view of FIG. 19.

Referring back to FIGS. 17–18, metal locking device 136 is shown being installed through receiving cavity 180 and partially inserted into mounting slot 160. FIGS. 19–20 show the metal locking device 136 fully inserted. As best shown in FIG. 18, when the metal locking device 136 is being installed, relief 182 allows the locking device to be inserted without interference with the locking device receiving cavity walls until the metal locking device 136 has been sufficiently inserted into the slot 160. This keeps the metal locking device straight during installation. At such time of partial insertion, fixed end 134 penetrates through wall 150 via entrance slot 152 of the mounting slot 160 while the at least one bent protruding tang 132 is still located in receiving cavity 180 above wall portion 150. That is, bent tang 132 is accommodated by the relief 182 so as to align the metal locking device while not inhibiting insertion. Upon further insertion, the at least one bent tang 132 is forced through the wall 150 to mounting slot 160 as shown and the inner support surface 162 becomes displaced (i.e., pushed to the right). After sufficient insertion, bent tang 132 becomes substantially within, and preferably entirely within, mounting slot 160, as shown in FIGS. 19–20. Due to this configuration, several elements assist in retaining the metal locking device securely within the mounting slot 160. First, the urged inner support surface 162 acts to bias the locking device 136 toward the outer support surface 164. That is, the inner support surface 162 elastically relaxes in an attempt to return to its original position. Further, while the shape of the bent tang 132 allows for a rather low resistance to insertion, due to the outwardly projecting jagged edges, tangs 132 tend to bite into the outer support surface 164 due to the biasing from the inner support surface 162. Forces acting to remove the metal locking device from slot 160 in direction T, as shown in FIG. 20, are resisted by the biting engagement of the sharp jagged edge of bent tang 132 against the outer support surface 164 and retaining ledge 154.

Figure 22:
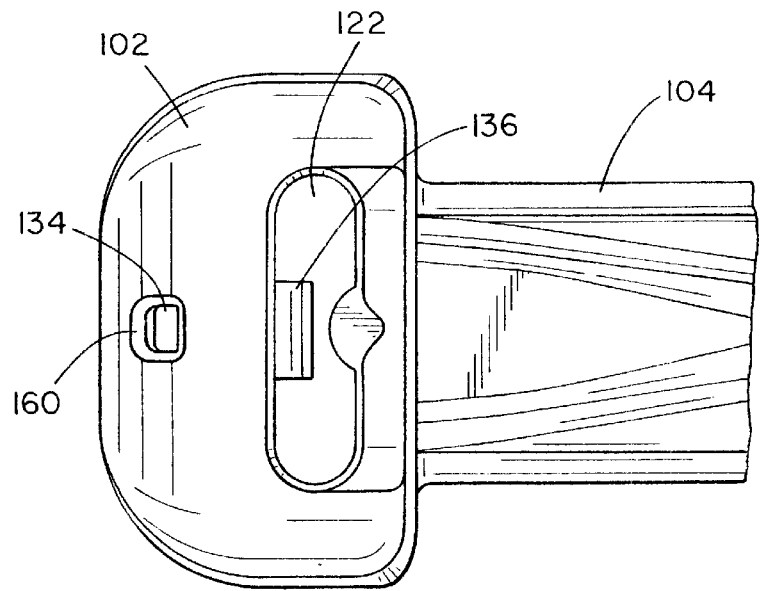
FIG. 22 is a bottom view of the cable tie according to the second embodiment.
Figure 21:
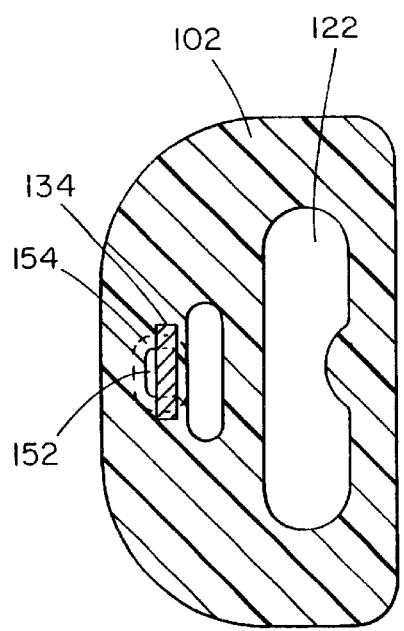
FIG. 21 is a cross-sectional view of the cable tie of FIG. 19 taken along line 21—21.
Figure 24:
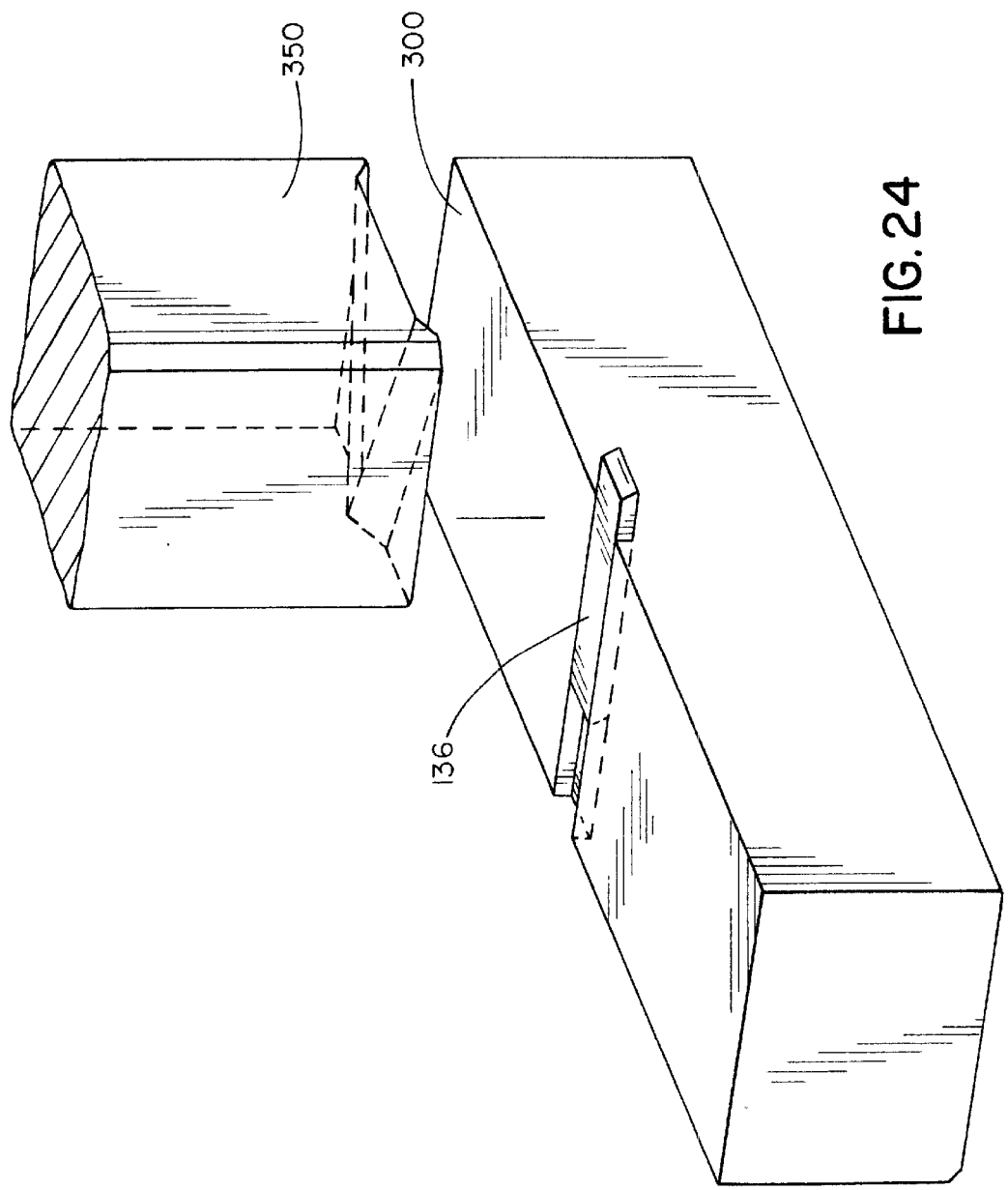
FIG. 24 is a perspective view of a die and punch used to make the metal locking device of FIGS. 10–13 before the punch has acted on the locking device.
Figure 25:
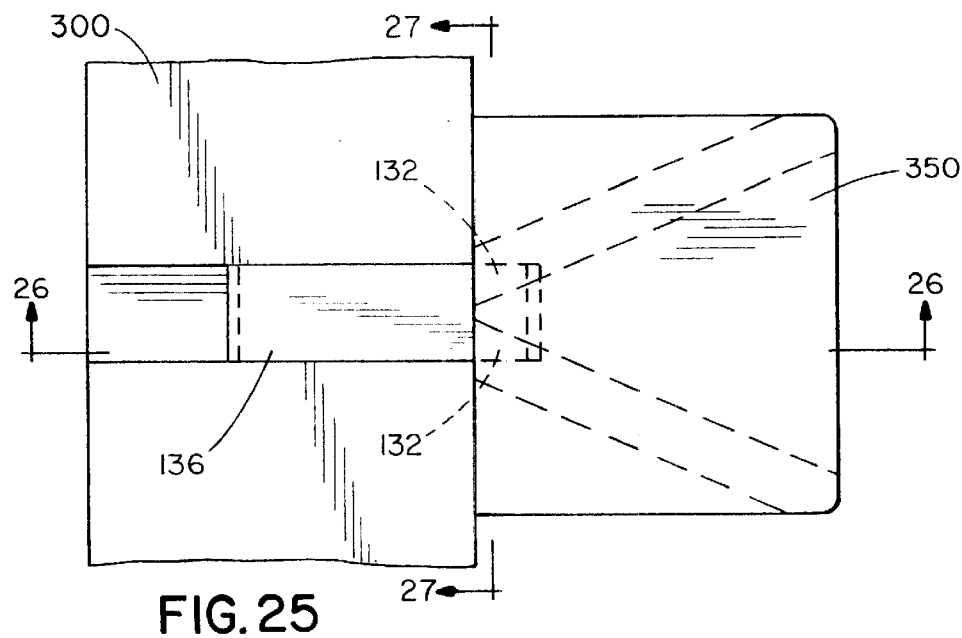
FIG. 25 is a top view of the punch of FIG. 24 engaged with the locking device.
Figure 26:
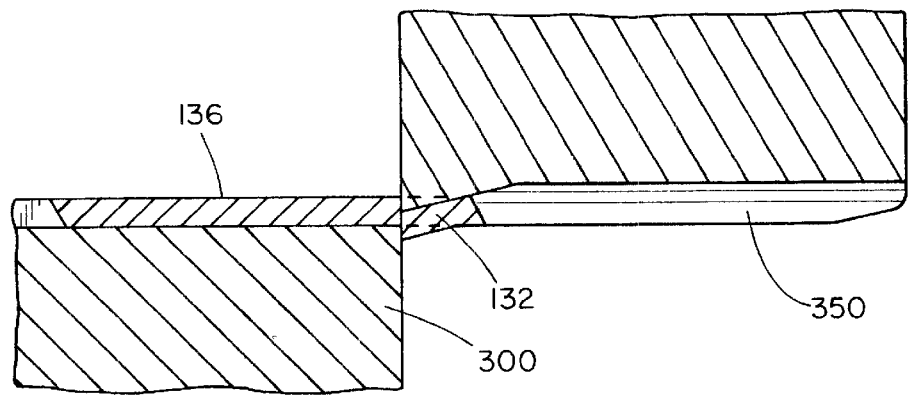
FIG. 26 is a front section of the punch of FIG. 24 engaged with the locking device.
Figure 27:
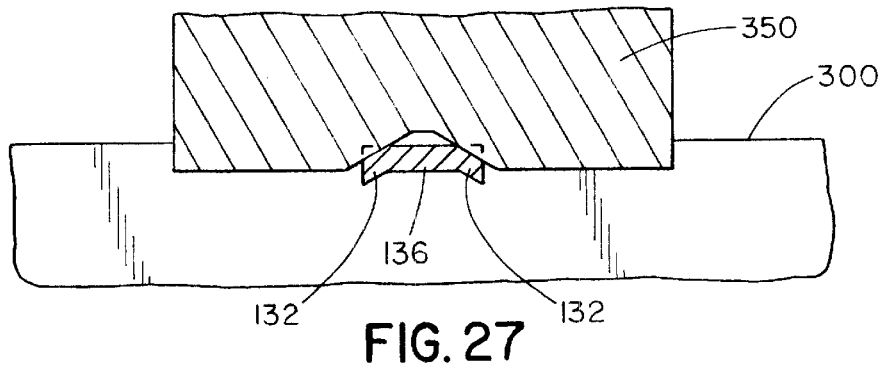
FIG. 27 is a right side section view of the punch of FIG. 24 engaged with the locking device.
Figure 28:
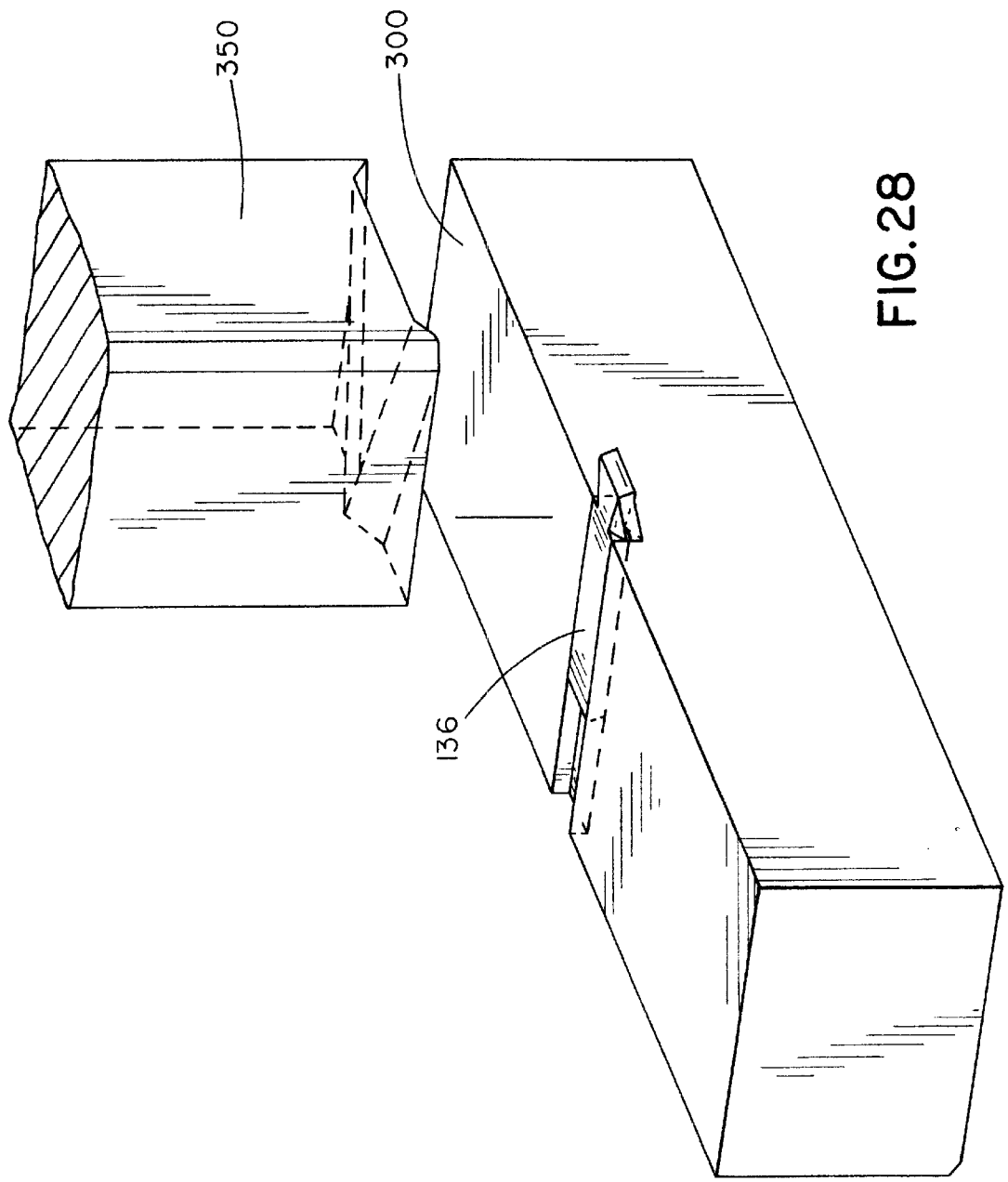
FIG. 28 is a perspective view of the punch and die of FIG. 24 after the punch has acted on the locking device.
Figure 29:
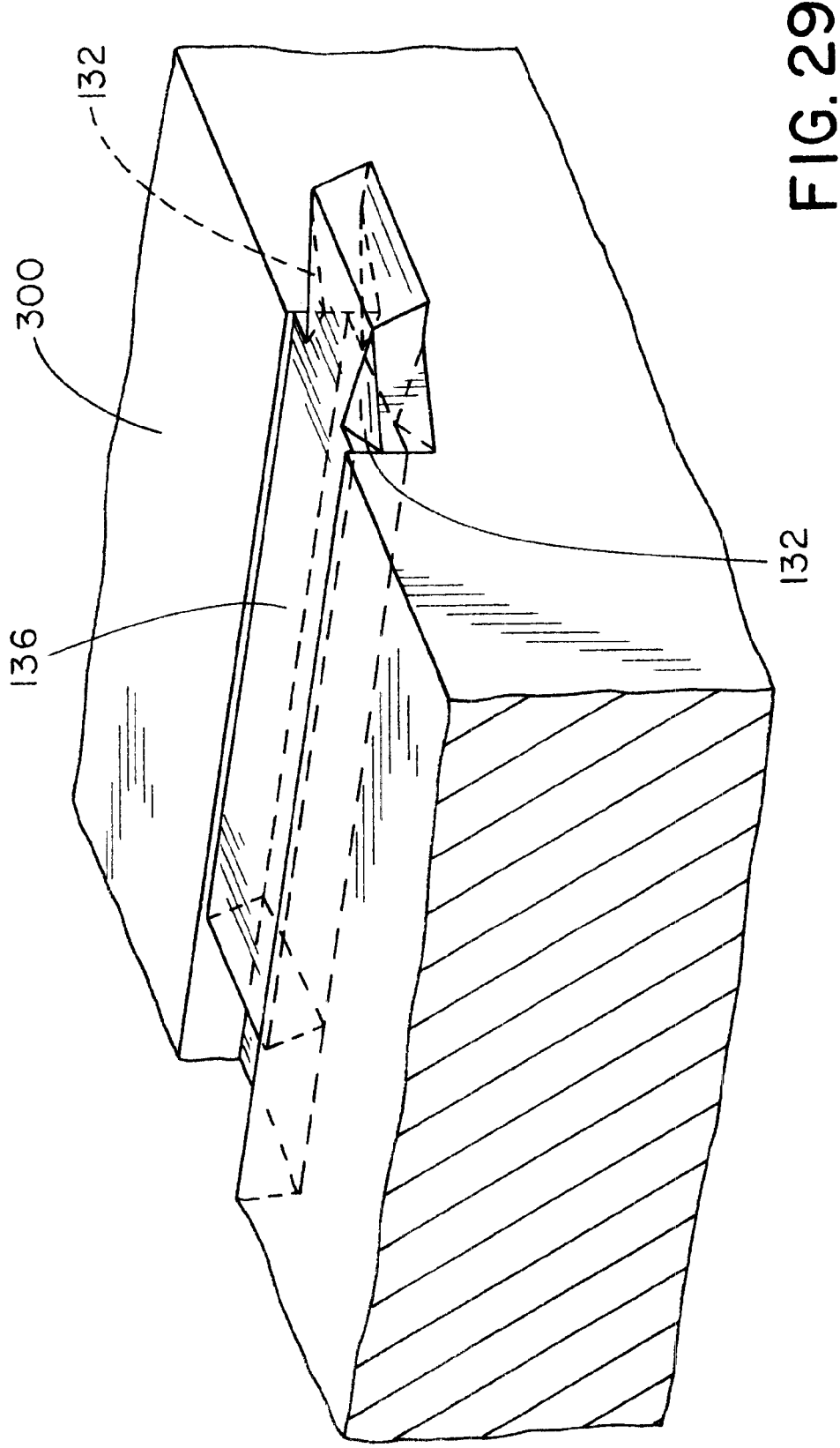
FIG. 29 is a close-up of the die of FIG. 28 showing formed bent tangs.
Figure 30:
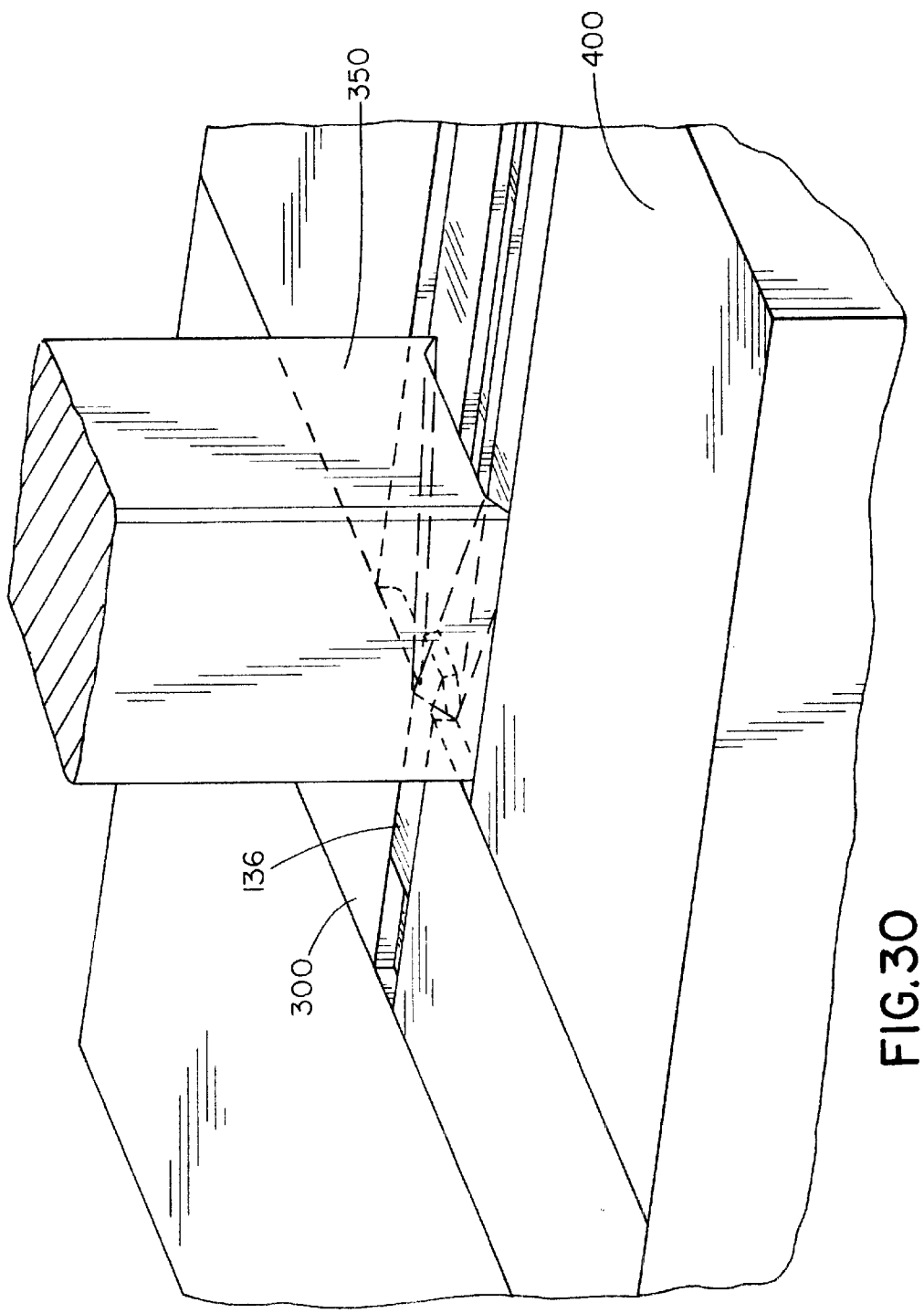
FIG. 30 is a perspective view of an alternative die and punch with an additional support base.
Figure 31:
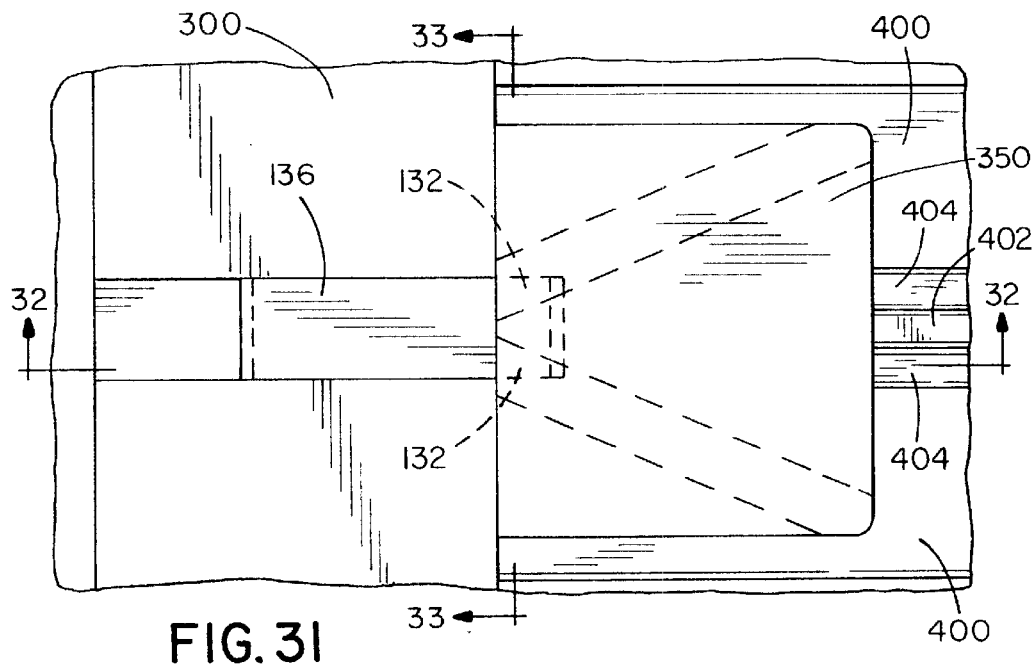
FIG. 31 is a top view of the punch of FIG. 30 shown engaged with the locking device.
Figure 32:
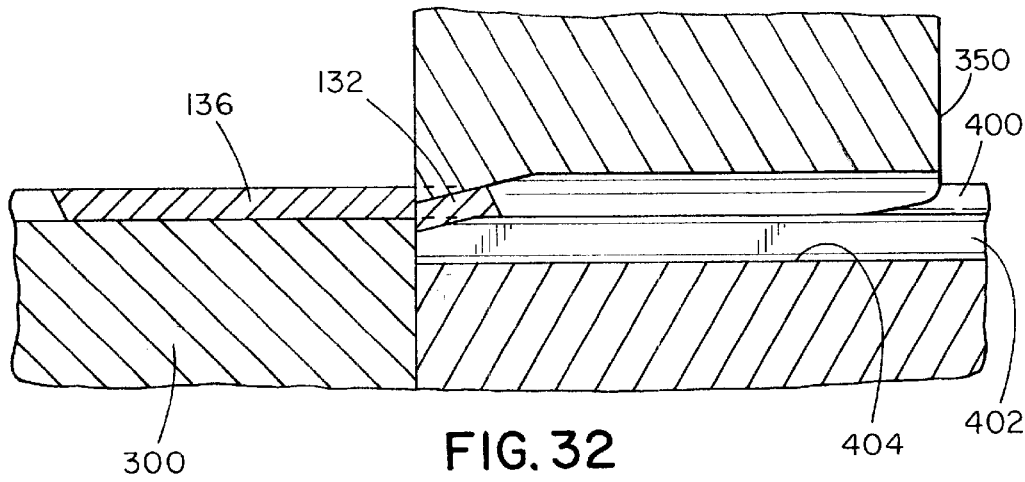
FIG. 32 is a front section of the punch of FIG. 30 shown engaged with the locking device.
Figure 33:
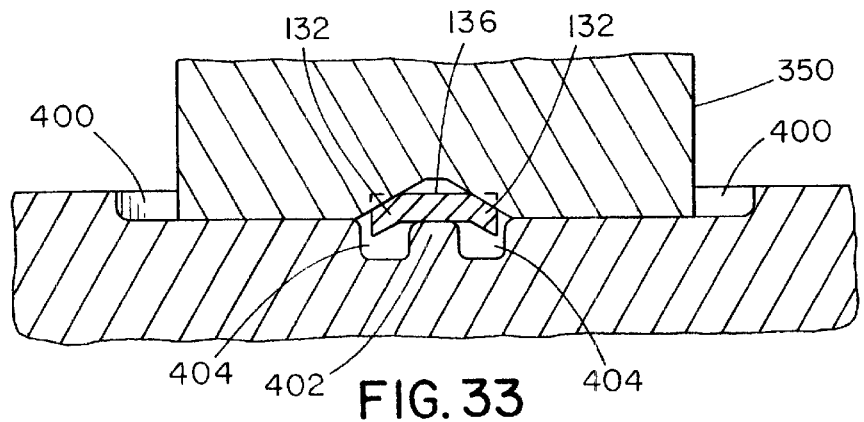
FIG. 33 is a right side section of the punch of FIG. 30 shown engaged with the locking device.
Figure 34:
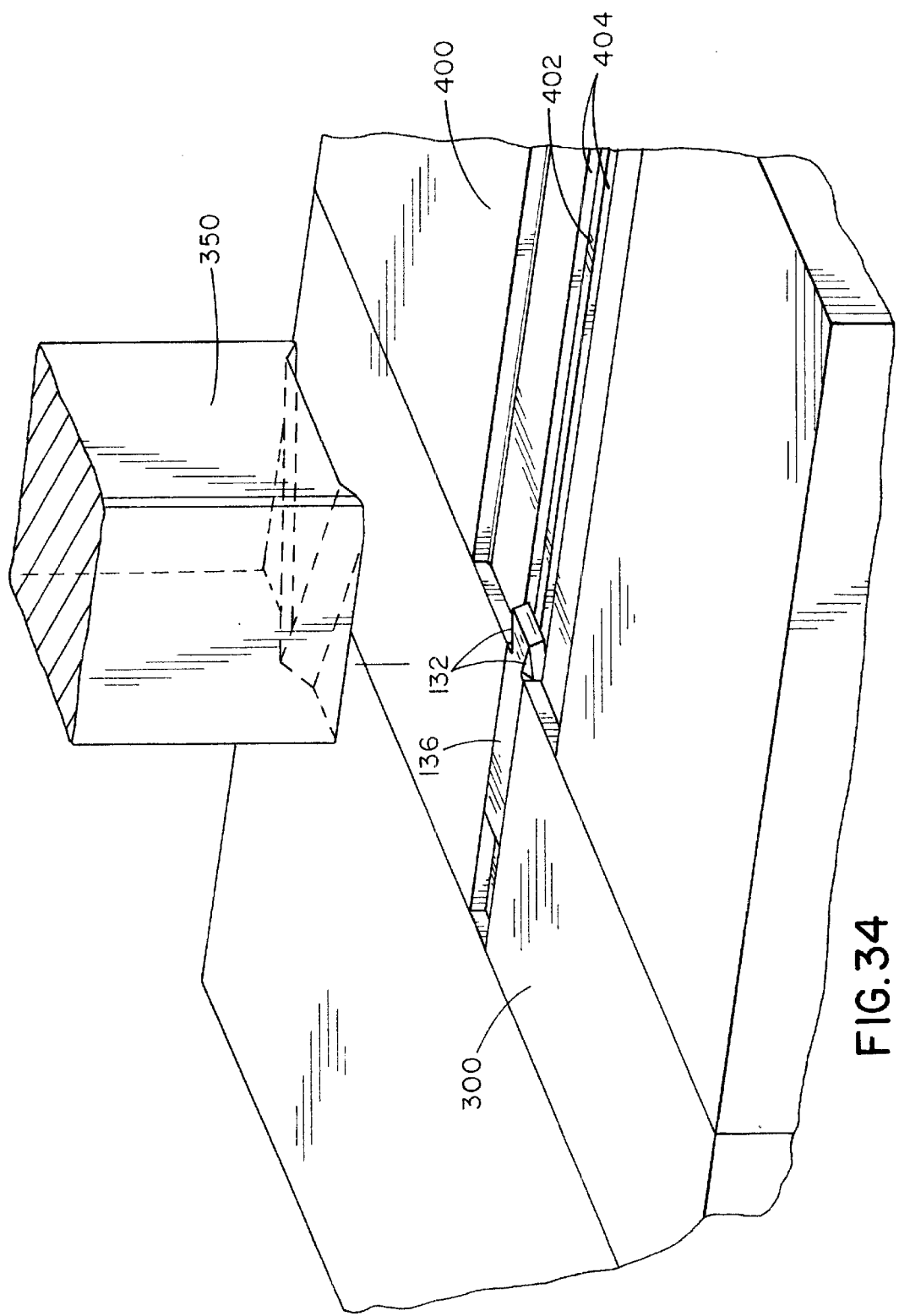
FIG. 34 is a perspective view of the punch and die of FIG. 30 after the punch has acted on the locking device.
Figure 35:
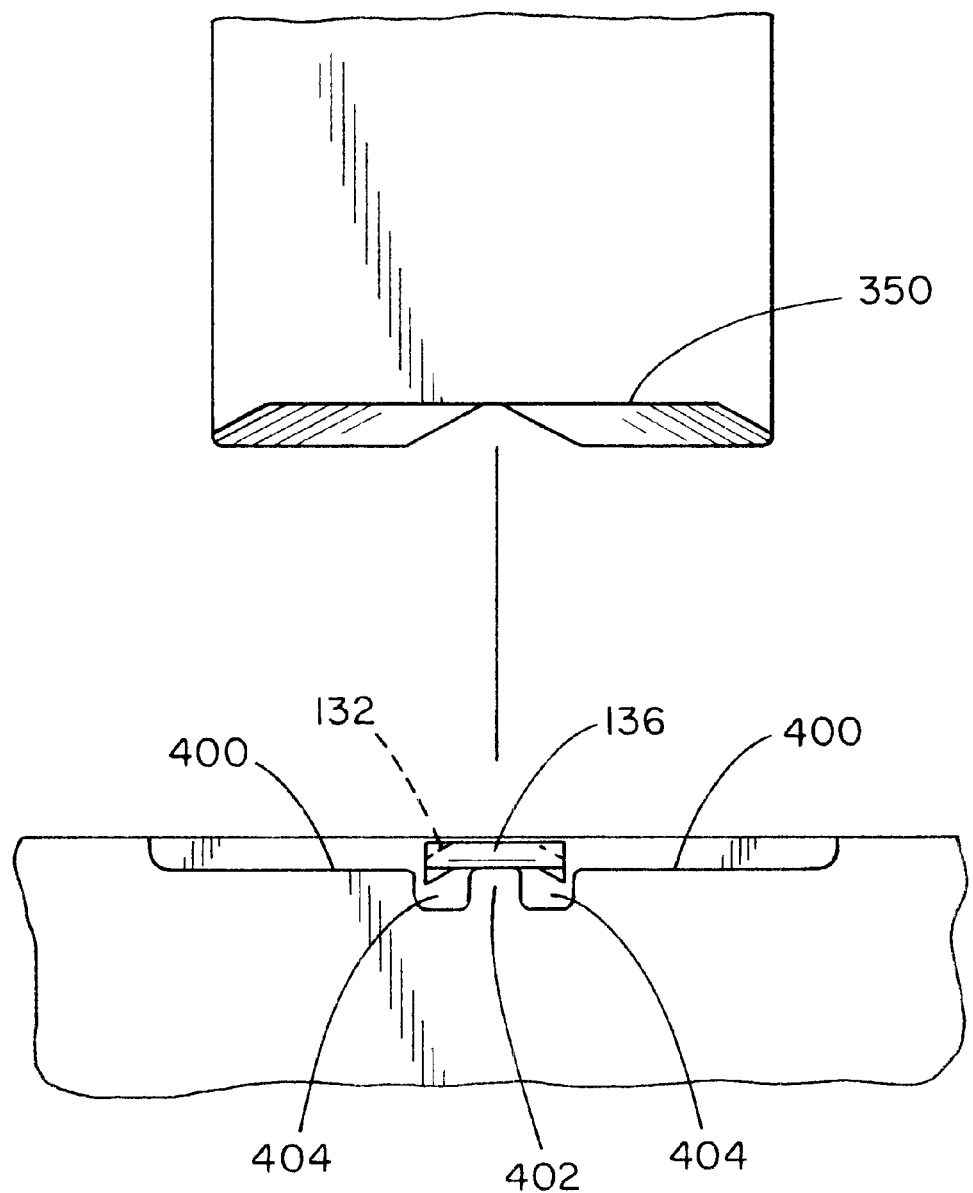
FIG. 35 is a front elevational view of the die of FIG. 30 shown after the punch has acted on the locking device.

Additional views of the second embodiment are shown in FIGS. 21–23, which show mounting slot 160 including an opening that extends entirely through the cable head 102 and to an external surface. The opening may be provided for manufacturing reasons and should be smaller than the lateral width of the locking device 136. The bent tangs 132 of the metal locking device can be formed by any known or subsequently developed method. However, two exemplary methods of forming bent tangs 132 for the preferred first embodiment (FIGS. 10–13) are illustrated in FIGS. 24–35. In FIG. 24, metal locking device 136 is placed in a punching die 300 and is acted upon by a punching ram 350. As shown, fixed end 134 overhangs die 300 by a predetermined distance corresponding to a desired location of bent tangs 132. Upon pressing of ram 350 against die 300 with a suitable pressing force dependent upon the material and size of element 136 selected, and subsequent opening of the die, metal locking devices 136 can be formed with the desired bent tangs 132 as shown in FIG. 28. Bent tangs 132 are better shown in the close-up of FIG. 29. To make the illustrated exemplary bent tangs, a lower face of punching ram 350 is provided with an inverted V-shaped tooling surface. However, this is merely one example of a tang structure. Other suitable tang structures are contemplated.

Once the bent tangs are formed, the metal locking device 136 is suitably formed and bent into the angled shape so that the free end is angled relative to the fixed end, such as by the method described in co-pending U.S. patent application Ser. No. 09/858,049, now U.S. Pat. No. 6,484,367, the subject matter of which is incorporated herein by reference in its entirety. Alternatively, the bent tangs may be formed after the metal locking device has been bent in the angled shape.

An alternative embodiment further is provided with a support base 400, which supports the overhanging portion of metal locking device 136 that extends beyond die 300 as shown in FIGS. 30–35. In this embodiment, the fixed end 134 is not free floating during punching but is instead supported by base 400. To allow for formation of the bent tangs 132, support base 400 is provided with a support surface 402 and two tang receiving cavities 404. During punching, support surface 402 will support the overhanging section of metal locking device 136. However, the cavities 404 allow formation of the tangs 132.

With either of the above embodiments, a beneficial anchoring of the locking device to the cable tie head can be achieved. The at least one tang provides additional resistance to metal locking device pullout to prevent failures of the cable ties, particularly during cable tie re-threading procedures after initial tensioning. The at least one tang also reduces the required depth of the anchor over that of previous systems that relied upon a straight locking device fixed end and frictional fit. Alternatively, instead of a single punching ram, two punching rams may be provided, with each forming one of the two bent tangs 132. In such a case, each ram could have a working face angled at an acute angle to the face of the metal locking device.

While the systems of the invention have been described in conjunction with the specific embodiments outlined above, it is evident that many alternatives, modifications and variations will be apparent to those skilled in the art. Accordingly, the exemplary embodiments are intended to be illustrative, not limiting. Various changes may be made without departing from the spirit and scope of the invention.

What is claimed is:

1. A method of forming a cable tie having a strengthened anchoring system, comprising the steps of:

forming a cable tie having a strap including a first end and a free end and a locking head secured to the first end of the strap, the locking head defining a strap accepting channel in the head having a strap entry end and a strap exit end, the locking head further including a metal locking device receiving cavity adjacent to and open toward the strap exit end of the locking head, the locking head further including a mounting slot having an inner support wall and an outer support wall;

forming a metal locking device with a fixed end having at least one bent tang and a free end;

initially mounting the metal locking device through the metal locking device receiving cavity into the mounting slot by inserting the fixed end into the support cavity until the fixed end is urged against the inner support wall; and further inserting the metal locking device into the mounting slot and causing the inner support surface to be resiliently deformed until the at least one bent tang is substantially received within the mounting slot, at which time the inner support surface urges at least an edge of the at least one bent tang against the outer support surface to securely anchor the metal locking device to the mounting slot.

2. The method of claim 1, wherein the at least one bent tang is formed by punch pressing of the metal locking device.

3. The method of claim 2, wherein the punch pressing forms a three-sided cut in the metal locking device to form a single bent barb.

4. The method of claim 2, wherein the punch pressing forms two bent tabs extending outward from side edges of the fixed end.

5. The method of claim 4, wherein the punch pressing is achieved in a single blow from a press ram at an angle normal to the face of the metal locking device.

6. The method of claim 1, wherein the step of forming a receiving cavity forms a receiving cavity wall with a relief sized to accommodate the at least one bent tang and minimize interference during metal locking device insertion.

7. The method of claim 1, further comprising a step of bending the free end of the metal locking device to be angled relative to the fixed end.

8. The method of claim 1, wherein the step of forming the cable tie head forms the strap accepting channel and the mounting slot to be substantially parallel.

* * * * *